$$\text{3,423,497}$$
APPARATUS AND PROCESSES FOR THE PREPARATION OF AN ENDLESS THREAD CABLE FOR PRECISION CUTTING
Walter Arnold, Heinsberg, and Karl Ostertag, Oberbruch, Rhineland, Germany, assignors to Vereinigte Glanzstoff-Fabriken AG., Wuppertal-Elberfeld, Germany
Filed Feb. 26, 1964, Ser. No. 347,519
Claims priority, application Germany, Mar. 1, 1963, V 23,724
U.S. Cl. 264—140         5 Claims
Int. Cl. D06h 7/00

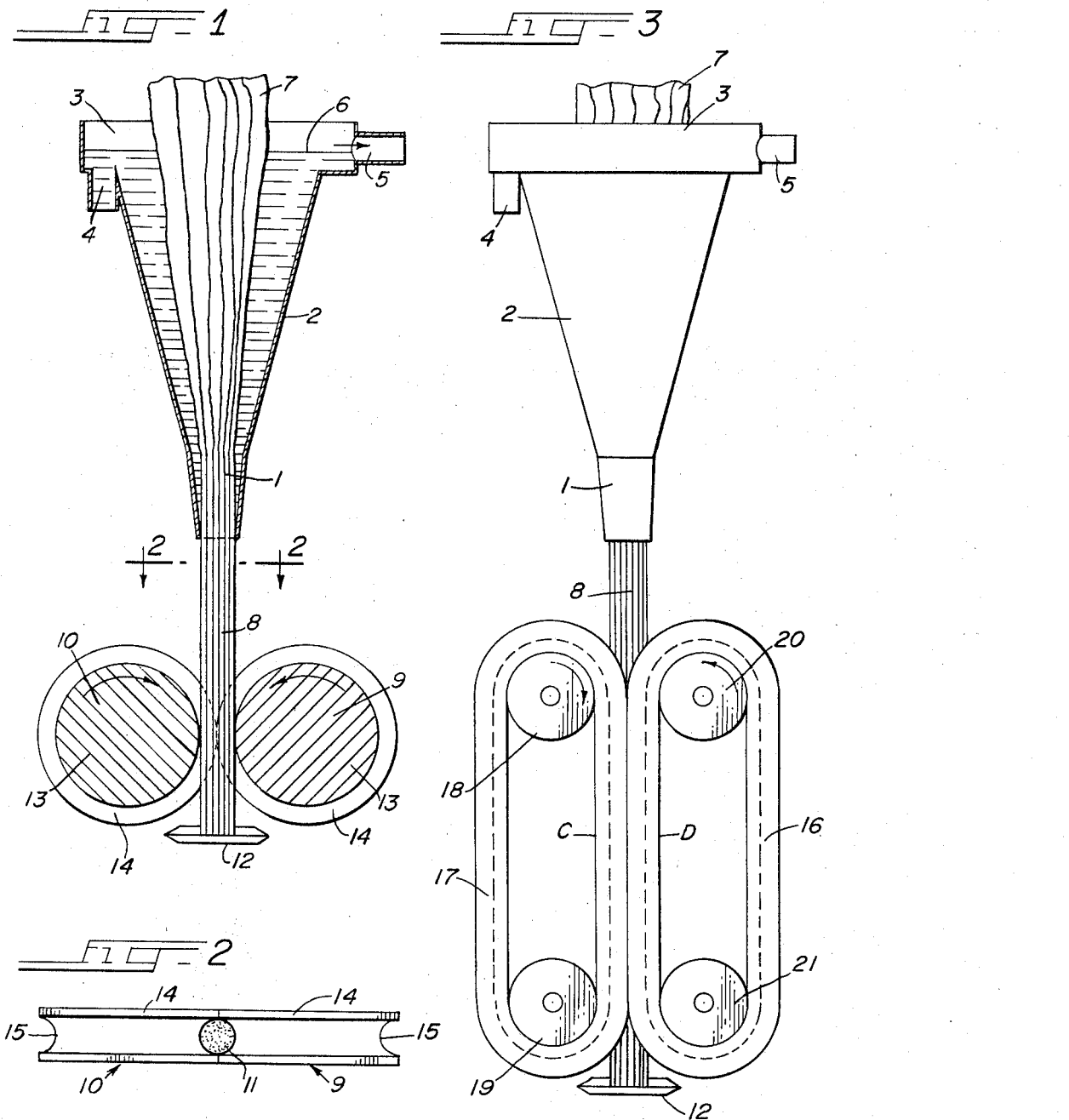

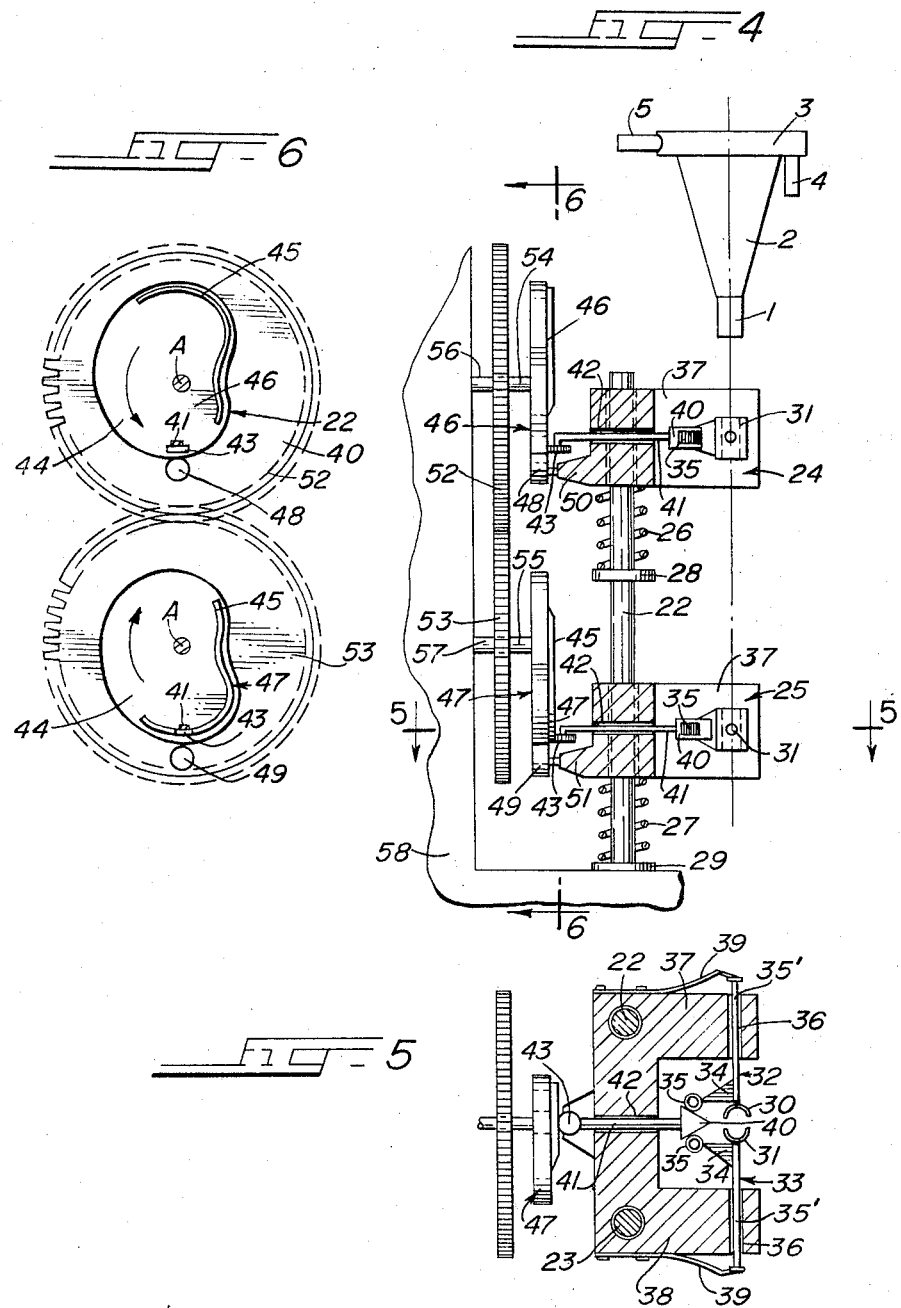

The invention relates to apparatus and processes for the preparation of an endless thread cable for precision cutting in staple-fiber cutting devices with a constant filament movement path and rotating blades.

For the cutting of staple fibers, various devices are known. In principle, all are based on three different basic designs. Thus, for example, staple-fiber cutting devices are known in which the thread or filament cable is conducted to a relatively rapidly turning disk in axially parallel direction to the axis of rotation of the latter and are then conducted outward through a radial passage. The cable, brought up through a feed mechanism with constant, defined velocity and driven outward by the circular acceleration acting in the rotating disk, is cut by blades to the desired length, which blades were spaced in intervals adapted to the circumferential velocity in relation to the delivery speed. Besides a number of other drawbacks, this design has the disadvantage that the filaments should remain exactly parallel for the maintenance of equal staple lengths. This is, in principle, impossible. Through the deflection during rotation of the disk the thread cable is constantly being twisted into itself, and these twists, in consequence of the friction between radial passage and thread cable, cannot be recompensated completely.

Another large group of staple-fiber cutting devices are represented by the designs in which the thread cable is brought by mechanical aids, for example conveyor rollers or conveyor belts or the like, up to the cutting point. All known devices of this type, however, have the drawback that they can be used only for very low draw-off speeds and strongly plied cable. The filament cable conduction, in consequence of the necessary spacing between cutting point and filament cable clamping point, is not sufficiently exact. This drawback comes to the fore especially when the staples to be cut are relatively short, that is, less than 10 to 20 mm. in length.

In a third large group of staple-fiber cutting devices the thread or filament cable is conveyed by means of nozzle structures by a liquid or gas jet to the cutting place and are conducted off in the cut-up state, if need be, also from the cutting place. This type of cable conduction generally gives a satisfactory result in the case of good construction of the nozzle as long as the staple length is in the order of 10 to 15 mm. Above this limit the fluctuations occurring in the length of the staple fiber, with good cable conduction, lie within the admissible tolerances. Below the limit values named, however, the deviations from the nominal or desired length are so great that the end product does not satisfy the desired standards.

The cable transport is accomplished in practically all constructions in such a way that a ring-gap nozzle is arranged around the cable, generally having a circular cross-section, through which nozzle the gas or the liquid is supplied with corresponding speed in as acute as possible an angle to the direction of forward movement of the cable and then flows into the correspondingly dimensioned cable passage. The transport is accomplished, therefore, primarily by fluid action against outside thread layer of the thread cable. In this system it is unavoidable that the velocity of the cable constituents diminishes from the outside inward on account of the relatively loose bundling between the individual thread or filament layers. The result is that at each successive cutting operation there is formed a dish-like hollow at the end of the cable. The filaments situated in the interior of the cutoff fiber bundle, having travelled less than those at the periphery, are shorter than the cut filaments in the outer, peripheral parts of the filament bundle.

According to the invention the drawbacks described are now eliminated by utilization of the good swelling capacity, in itself known, of regenerated cellulose filaments, which leads to the stiffening designated in the following with the term "water stiffness." The process according to the invention lies especially in the feature that the filament cable or bundle is first uniformly moistened as a loose cable or bundle to bring about the swelling of the filaments. The moistened cable or bundle is thereupon, through radially acting pressure, under maintenance of a preferably round cross-section, again squeezed out and, without disturbance of the resulting cross-section, is transported to the cutting device.

The apparatus according to the invention for the execution of the process described consists, accordingly, in a nozzle, preferably of round cross-section, having at its upper end a funnel-shaped portion with overflow, a draw-off device arranged under it, which device's free cross-section is adapted to the nozzle mouth, and a staple-fiber cutting device of any suitable type.

It is, in itself, known that regenerated cellulose has a high swelling capacity and in this state exhibits a generaly highly undesirable "water stiffness." It was now found that the stiffening of the filament cable or bundle, if it is first uniformly moistened and thereby caused to swell, thereupon again pressed out and moved in the form thus assumed until reaching the cutting place, is very rigid and that the strength of the resulting stiffened filament rod can be used in order to achieve highly uniform feeds to the cutting place. This is achieved by a process such that the cable introduced into the apparatus from above is first conducted in the loosened state through a water bath, then into a conically tapered nozzle and there compressed to a diameter such that the part of the liquid not needed for the swelling is again removed. Directly under this nozzle there is mounted the draw-off device, which may be a profiled pair of rollers, a profiled double conveyor belt or a cam-operated gripper mechanism. The profile of the filament bundle contacting parts of the take-off devices is adapted to the discharge cross-section of the nozzles in such a way that the cross-sectional form of the cable is not deformed in passage through the take-off device, but is merely compressed uniformly to the degree necessary for the achievement of adequate frictional contact. This operation, as, it was found, does not disturb the stiffness of the bundle.

The process aspects of the invention are illustrated in the following examples.

EXAMPLE 1

A loose, viscose filament cable of 500,000 den. is moistened with water by passage through a funnel having at its lower end a frusto-conical nozzle through which the moistened bundle emerges. Over a length of about 45 mm. the inner wall of this nozzle is tapered from 17 to 11 mm. The excess moisture is squeezed out of the filament bundle in passage through the nozzle.

The squeezed, uniformly moistened bundle is drawn continuously from the nozzle by a pair of opposed, draw-off rollers. The opposed faces of the rollers each are lined with soft rubber, and each opposed rubber-lined face has a cricular, peripheral groove of semicircular cross-section directly opposite the other groove, said grooves defining between the opposed faces of the rollers a cylindrical opening of about 9 mm., a size slightly smaller than the diameter of the cable being drawn thereby. This apparatus is defined in more detail in following portions of the specification.

The filament bundle is fed to a rotary blade, staple fiber cutting device located immediately adjacent the rollers, and the bundle is cut into staple fibers.

EXAMPLE 2

A cable of 420,000 den. is conducted through a conical nozzle. Over a length of 45 mm. the diameter diminishes from 17 to 11 mm. The diameter of the hollow profile of the draw-off device is 10 mm.; the draw-off rollers are lined with hard rubber. The bundle is cut as in Example 1.

In both examples, the fialment bundle was solidified to such an etxent that no measurable deviations from the mean staple fiber length could be observed.

Embodiments of apparatus of the invention are illustrated in the drawings, wherein:

FIG. 1 is a section through the apparatus of the invention employing a profiled roller pair as the draw-off device;

FIG. 2 is a section view taken on plane 2—2 of FIG. 1;

FIG. 3 is a side elevation of another embodiment of the invention employing profiled, double conveyor belts as the draw-off device;

FIG. 4 is a side elevation, partly in section, of a further embodiment of the invention employing reciprocal grippers as the draw-off device;

FIG. 5 is a section through the apparatus of FIG. 4 on plane 5—5 thereof; and

FIG. 6 is a side elevation of the cam drive mechanism of the embodiment of FIG. 4, as viewed from plane 6—6 of FIG. 4.

Referring to FIG. 1, the upper part of the apparatus consists of a funnel 2 with the squeeze nozzle 1 at the lower end and the dish-shaped portion 3 at the upper end. Water is supplied to the funnel through the tube 4 and runs off again through overflow tube 5 at a rate to maintain a constant level 6. In the case of reversed water flow, i.e., inflow through tube 5 and discharge through tube 4, there is established a water level corresponding to the upper end of tube 4.

The thread or filament cable consisting of endless threads or filaments enters the input funnel as a loose bundle. In this state, the filaments are thoroughly and uniformly moistened and swell correspondingly. With the aid of the profiled conveyor roller pair 9, 10, the cable is then drawn through the tapered nozzle 1, which has a cross-section corresponding to the cross-section of the dry, unswollen cable in such a way that the water not needed for the swelling of the filaments is squeezed out. Thereby, there is produced in the cable the so-called "water stiffness," in itself known, to such a degree that on its discharge from the squeeze nozzle 1, it is comparable in its rigdity to a stiff stick or rod.

Through exact adaptation of the cross-section 11 of the stiff bundle and the profiled draw-off devices, the structure of the rigid cable 8 is not destroyed by the draw-off device, and the rigidity produced remains preserved until the cable reaches the cutting device, represented figuratively at 12.

The opposed rollers 9 and 10 each comprise a hub 13 with a rubber ring 14 secured thereon. The outer, circumferential faces of rings 14 each are profiled to provide therein a substantially semi-circular, peripheral groove 15. At the point where the two rollers meet, the grooves 15 form an approximate cricle in which the stiff, filament bundle is grasped and drawn through the rollers. The dimensions of the substantially circular, free cross-section of the grooves of the conveyor rollers are smaller than those of the nozzle orifice, preferably by about 3% to 20%. The precise difference depends considerably on the nature of the surfaces of rings 14 coming in contact with cable 8, e.g., the hardness of the rubber rings, as illustrated in the foregoing examples.

Instead of the two conveyor rollers 9 and 10, it is possible to use profiled belts 16, 17 (FIG. 2), which run over the rollers 18, 19, 20 and 21. The belts are made of an elastomer, and each has a groove of semicircular cross-section extending therearound to provide a circular opening therebetween, in which is gripped the bundle as in the case of the rollers 9 and 10. The dimensional relationship between the size of the opening and the cross-section dimension of the bundle is the same as for the roller opening dimensions previously described.

In the embodiment of FIGS. 4–6, there are two cylindrical slide rails 22 and 23, on which are slidably mounted slide members 24 and 25. These slide members are bored to receive rails 22 and 23 and are seated against coil springs 26 and 27, in which, in turn, are seated about rails 23 and 24 on the fixed rings 28 and 29 on the rails. The grippers consist of the arcuate gripping jaws 30 and 31, which are fixedly mounted on plungers 32 and 33.

The plungers 32 and 33 each comprise a base 34 carrying a roller 35. The base 34 is supported on arm 35' slidably journalled in journal passages 36 in the arms 37 and 38 of each of the slide members 24 and 25.

The jaw pairs 30 and 31 are urged resiliently toward each other by leaf springs 39 attached to opposite sides of the slide members 24 and 25 with a free end of each spring bearing against the outer end of arms 35'. The jaws are spread apart by a wedge 40 having diverging sides against which the rollers 35 bear. When wedge 40 moves toward the jaws 30 and 31, the plungers 32 and 33 spread apart against the bias of springs 39. Conversely, when wedge 40 moves away from the jaws, the plungers move toward each other.

The wedge 40 is supported on a rod 41 slidably journalled in the journal passage 42 of each of slide members 24 and 25. The bias of springs 39 urges rollers 35 toward each other, thereby urging wedge 40 rearwardly away from jaws 30 and 31. The rearward end of rod 41 carries a roller 43 which rolls against the face 44 or the outer edge of a curved track 45.

The jaws 30 and 31 are in filament bundle clamping position when roller 43 rides on the face 44 and in nonclamping position when roller 43 rides on the track 45 by virtue of the linear movement of the rod 41 and wedge 40 and resultant moving together or apart of jaws 30 and 31.

The faces 44 and tracks 45 are part of rotatable cam plates 46 and 47. The outer, camming edge of cams 46 and 47 bear against cam follower rollers 48 and 49, respectively, which rollers are rotatably journalled by shafts mounted on the ears 50 and 51 of the slide members 24 and 25, respectively.

Cams 46 and 47 are rotated in opposite directions by the meshed spur gears 52 and 53, respectively, about the axes of rotation A of the respective gear and cam pair, cams 46 and 47 being attached to the respective gears by the shafts 54 and 55. The gears are rotatably journalled by gear shafts 56 and 57 in shaft journals of a rigid machine base 58 (shown in fragment), on which base the rails 22 and 23 are also rigidly mounted.

The cam action of the cam 46 is in opposite phase to the cam 47. When cam 47 is driving slide member 25 downwardly and compressing spring 27, cam 46 is allowing slide member 24 to rise under the urging of spring 26, and vice versa. When each slide member 24 or 25 begins its downwardly movement, roller 43 moves off track 45, allowing wedge 40 to move away from jaws 30 and 31. The action of springs 39 clamps jaws 30 and 31 around the stiff filament bundle extending therethrough whereby the bundle is pulled downwardly with the downwardly moving slide member. At or near the end of the downward movement of the slide member, roller 43 rides up on track 45, and wedge 40 moves toward the jaws and causes them to spread and disengage from the bundle. The slide member rises with the jaws 30 and 31 in the latter position. By operating slide members 24 and 25 and their respective jaws 30 and 31 in opposite phase, the filament bundle is drawn out of nozzle 1 in substantially continuous linear movement. The bundle is cut just below slide member 25 in the manner previously described.

In the orientation shown in FIGS. 4–6, the upper slide member 24 is at the beginning of its downward movement, and the lower slide member 25 is at the beginning of its upward movement. Shortly before reversal of the motion of the slide members at their lowest point of travel, roller 43 runs onto cam track 45, releasing the jaws 30 and 31 from the filament bundle. The curves of the camming edges of cam plates 46 and 47 are designed such that the downward movement of the respective slide members controlled thereby is a uniform linear speed from the moment the jaws 30 and 31 clamp the filament bundle until they release the bundle. The upward return of the slide members is more rapid. The clamping action of a respective set of jaws 30 and 31 is slightly superimposed or overlapped with the clamping action of the other set of jaws so that at least one set of jaws is always in grips with the filament bundle, e.g., by having the extremes of the downward drive portion of the cams extend over slightly more than 180° of the periphery of the cam surface and correspondingly having the opposite ends of the wedge operating surfaces of tracks 45 in an arc defined by radii from axis A through said opposite ends at slightly less than 180°.

The invention is hereby claimed as follows:

1. A process for producing staple fibers which comprises thoroughly wetting the filaments of a loose filament bundle of regenerated cellulose filaments with water, squeezing the excess water from said bundle and forming a relativel stiff rod of said wetted filaments, conveying said stiff rod of filaments to a filament cutting device, and cutting the filaments of said stiff rod into staple fibers of substantially uniform lengths.

2. A process for producing staple fibers which comprises conveying a loose filament bundle of regenerated cellulose filaments through a body of water and therein thoroughly wetting the filaments of said bundle, drawing the wetted filaments through a tapered squeezing zone of substantially circular cross-section, squeezing the bundle of wetted filaments in said zone to remove excess water from said bundle and forming thereby a relatively stiff rod of said wetted filaments, conveying said stiff rod of filaments to a filament cutting device, and cutting the filaments of said stiff rod into staple fibers of substantially uniform lengths.

3. Apparatus for producing staple fibers of regenerated cellulose which comprises a tank, a tapered nozzle on a wall of said tank adapted to squeeze said filament bundle, and a draw-off device outside said tank and below said nozzle and having gripping means for gripping said filament bundle and drawing it through said tank and out of said nozzle and feeding said bundle to a cutting device for cutting said filaments into staple fibers, wherein said gripping means comprises upper jaw means having a set of opposed clamping jaws and lower jaw means having a set of opposed clamping jaws, each set of clamping jaws having its opposed jaws movable toward closed position for gripping said filament bundle and open position for releasing said bundle, cam operated means and first and second spring means coacting with said upper jaw means (a) to close said jaws and move said upper jaw means in a downward stroke and (b) to open said jaws and move said upper jaw means in an upward stroke; additional cam operated means and additional first and second spring means coacting with said lower jaw means (a) to close said jaws and move said lower jaw means in a downward stroke and (b) to open said jaws and move said lower jaw means in an upward stroke in opposite phase to the downward and upward strokes of said upper jaw means.

4. Apparatus as claimed in claim 3, wherein said upper jaw means and said lower jaw means respectively are supported by said first spring means, and said cam operated means comprises a rotatable cam for each jaw means with a cam follower operated by each rotatable cam for moving each jaw means downwardly against the action of the respective first spring means and releasing said jaws for upward movement under the urging of said first spring means, said cams operating in opposite phase.

5. Apparatus as claimed in claim 4, wherein said clamping jaws are urged toward closed position by said second spring means, and wedge means operable by said rotatable cams for moving said jaws to open position as the respective rotatable cam releases the respective jaw means for upward movement by the respective first spring means thereof.

References Cited

UNITED STATES PATENTS

| | | | |
|---|---|---|---|
| 2,051,011 | 8/1936 | Smith | 18—19 |
| 2,311,704 | 2/1943 | Simison. | |
| 3,079,930 | 3/1963 | Cobb et al. | |
| 3,131,429 | 5/1964 | Okamura | 18—8 |
| 3,190,294 | 6/1965 | Dunlap. | |
| 2,904,840 | 9/1959 | Hochreuter | 264—343 X |

FOREIGN PATENTS

| | | |
|---|---|---|
| 63,535 | 5/1945 | Denmark. |
| 608,904 | 11/1960 | Canada. |

ROBERT F. WHITE, *Primary Examiner.*

S. I. LANDSMAN, *Assistant Examiner.*

U.S. Cl. X.R.

264—198, 343; 18—1, 8; 264—145